(12) United States Patent
Urbonas (10) Patent No.: US 9,946,018 B1
(45) Date of Patent: Apr. 17, 2018

(54) SURFACE-GUIDING PHOTONIC DEVICE WITH TEMPERED GLASS

(71) Applicant: International Business Machines Corporation, Armonk, NY (US)

(72) Inventor: Darius Urbonas, Rueschlikon (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/464,705

(22) Filed: Mar. 21, 2017

(51) Int. Cl.
*G02B 6/10* (2006.01)
*G02B 6/122* (2006.01)
*G02B 6/12* (2006.01)

(52) U.S. Cl.
CPC .... *G02B 6/122* (2013.01); *G02B 2006/12038* (2013.01); *G02B 2006/12097* (2013.01)

(58) Field of Classification Search
CPC ............ G02B 2006/12038; G02B 2006/12097
USPC ......................................................... 385/131
See application file for complete search history.

(56) References Cited

U.S. PATENT DOCUMENTS

| 4,919,504 A | 4/1990 | Colas | |
|---|---|---|---|
| 2003/0076487 A1* | 4/2003 | Cannon | C03B 27/0413 356/33 |
| 2006/0132919 A1* | 6/2006 | Schnell | B29D 11/00125 359/565 |
| 2011/0232211 A1* | 9/2011 | Farahi | B32B 5/022 52/173.3 |

FOREIGN PATENT DOCUMENTS

| CN | 105393368 A | 3/2016 |
|---|---|---|
| WO | WO2015081436 | 6/2015 |

OTHER PUBLICATIONS

Graham D. Marshall, "Direct laser written waveguide—Bragg gratings in bulk fused silica. Optics Letters / vol. 31, No. 18 / Sep. 15, 2006". pp. 2090-2691.
V. White et al, "A new method for producing graded index PMMA waveguides". IEEE Photonics Technology Letters vol. 7, Issue: 7, Jul. 1995. pp. 772-773.
Yang Liao et al., "Transverse writing of three-dimensional tubular optical waveguides in glass with a slit-shaped femtosecond laser beam". pp. 1-17, Sci Rep. 2016; 6: 28790. Published online Jun. 27, 2016. doi: 10.1038/srep28790.

* cited by examiner

*Primary Examiner* — Jerry Blevins
(74) *Attorney, Agent, or Firm* — Daniel P. Morris; Otterstedt, Ellenbogen & Kammer, LLP (57) ABSTRACT

A surface-guiding photonic device includes a planar, tempered glass, comprising a bulk layer and a tempered superficial layer contiguous with the bulk layer. The superficial layer is at least partly exposed to air and has an intrinsic gradient refractive index in a direction z perpendicular to a main plane of the glass, whereas the bulk layer has a refractive index that is essentially constant along direction z. The average refractive index of the superficial layer is larger than each of: (i) the average refractive index of the bulk layer; and (ii) the refractive index of air. The glass can include lateral structures, e.g., trenches, extending parallel to the propagation direction y, so as for the device to have a rib waveguide-like configuration. The lateral structures form recesses in the superficial layer, so as to laterally confine radiation propagating in the tempered superficial layer, by total internal reflection.

20 Claims, 4 Drawing Sheets

SURFACE-GUIDING PHOTONIC DEVICE WITH TEMPERED GLASS

BACKGROUND

The invention relates in general to the field of surface-guiding photonic devices and related devices. In particular, it concerns a surface-guiding photonic device fabricated from a planar, tempered glass.

Photonic devices, such as sensors, are known, which involve a glass substrate. Out-of-plane confinement of light is achieved thanks to additional layers of materials or laser-written features, located under the glass substrate. Such devices allow surface guiding of light and ensure small optical losses.

For example, buried glass photonic devices (written with femto-laser pulses) are known, which allow low optical losses (~0.027 dB/cm). Minimizing propagation losses is desired, in order to reduce power dissipation and hence thermal dissipation of the light, and, in turn, maintain efficient optical guiding, with little light scattering.

SUMMARY

According to a first aspect, the present invention is embodied as a surface-guiding photonic device. This device includes a planar, tempered glass, which can be regarded as comprising a bulk layer and a tempered superficial layer, the latter being nevertheless contiguous with the bulk layer. The tempered glass is arranged in the device so as for its superficial layer to be at least partly exposed to air. The tempered superficial layer has an intrinsic gradient refractive index in a direction z perpendicular to a main plane of the planar, tempered glass, whereas the bulk layer has a refractive index that is essentially constant along direction z. The average refractive index of the superficial layer is larger than each of: (i) the average refractive index of the bulk layer; and (ii) the refractive index of air. This way, it is possible for the device to confine (perpendicularly to said main plane) radiation propagating in the tempered superficial layer along a propagation direction y (in-plane, i.e., parallel to the main plane of the glass, in operation.

In embodiments, the planar, tempered glass further comprises lateral structures, e.g., trenches, extending parallel to the propagation direction y, so as for the device to have a rib waveguide-like configuration. The lateral structures form recesses in the superficial layer, which make it possible to laterally confine radiation propagating in the tempered superficial layer along said propagation direction y, by total internal reflection.

According to another aspect, the invention is embodied as a consumer good that comprises the above surface-guiding photonic device. The consumer good may for instance be a handheld user device, having a display, wherein the surface-guiding photonic device is arranged as a protective cover glass of the display.

Devices embodying the present invention will now be described, by way of non-limiting examples, and in reference to the accompanying drawings.

The accompanying drawings show simplified representations of devices or parts thereof, as involved in embodiments. Technical features depicted in the drawings are not necessarily to scale. Similar or functionally similar elements in the figures have been allocated the same numeral references, unless otherwise indicated.

DETAILED DESCRIPTION

In reference to FIGS. 1-7, an aspect of the invention is first described, which concerns a surface-guiding photonic device 10, 10a, 10b.

This device comprises a planar, tempered glass 12, 14. As for instance depicted in FIGS. 2-4, the glass substrate latter can be regarded as comprising a (thick) bulk layer 14 and a (thin) superficial layer 12, which is in fact contiguous with the bulk layer 14.

The planar glass 12, 14 is assumed to have been processed by controlled thermal and/or chemical treatments, so as to intrinsically have a graded refractive index. Such processes are usually performed in order to increase the strength of the glass, compared with normal glass. Yet, and as the present Inventor has realized, the graded refractive index that results from such processes can be exploited to confine light perpendicularly to the main plane of the glass (i.e., out-of-plane, along vertical axis z in FIGS. 2-6).

Figure 2:
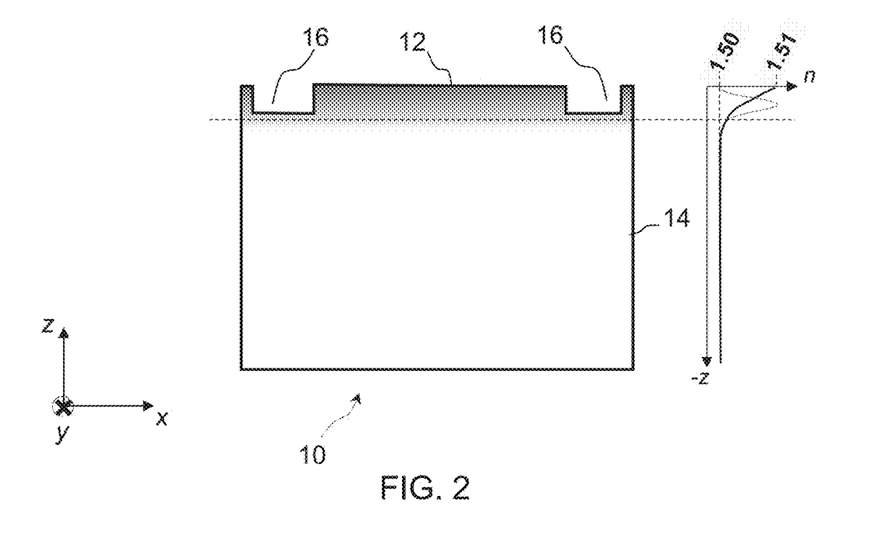
FIG. 2 is a 2D cross-sectional view of the device of FIG. 1, portraying section A-A in the cutting plane identified in FIG. 1. A corresponding profile (full-line) of the gradient refractive index is depicted on the right-hand side. The dotted-line curve shows a possible variant to this profile.

As for instance illustrated in FIG. 2, the bulk layer 14 can be defined as the layer portion of the planar glass, where the refractive index is essentially constant (along z), while the superficial layer is the upper, superficial portion where the refractive index substantially varies.

Preferably, the planar glass substrate 12, 14 is obtained by a chemical toughening process, which forces the superficial layer 12 into compression by ion exchange of sodium ions (in the superficial layer) with potassium ions, e.g., by immersion of the glass into a bath of molten potassium nitrate. In that case, the superficial layer 12 contains implanted ions, as per the ion exchange process. The thickness of the superficial layer 12 depends on the ion penetration lengths and, thus, on the exact fabrication process used, as known per se. Yet, because of the limited dispersion of the ion penetration lengths, one can normally easily distinguish a superficial layer 12 from the bulk layer 14.

More generally, a planar glass substrate as used herein is assumed to have been processed so as to exhibit a graded refractive in a superficial thickness of a main surface thereof. As a result, the superficial layer 12 exhibits an intrinsic gradient refractive index, i.e., a refractive index that varies in direction z perpendicular to the main plane (x, y) of the tempered glass 12, 14. The index of the layer 12 may vary more or less linearly, or not (compare the dotted curve to the full-line curve in the right-hand side graph of FIG. 2). In the cross-sections depicted in FIGS. 2-6, the refractive index is depicted as a graded fill. The darker, upper regions have a higher refractive index, assuming the latter increases toward the upper surface, consistently with the full-line curve depicted on the right-hand side graph of FIG. 2. On the contrary, the bulk layer 14 has an essentially constant refractive index along that same direction z.

Note that while the two layers 12, 14 are here differentiated for description purposes, it remains that these are contiguous, planar portions of a same glass substrate, such that only one substrate 12, 14 is involved, which does not necessarily need be coated by additional layers of material to enable optical propagation.

Figure 7:
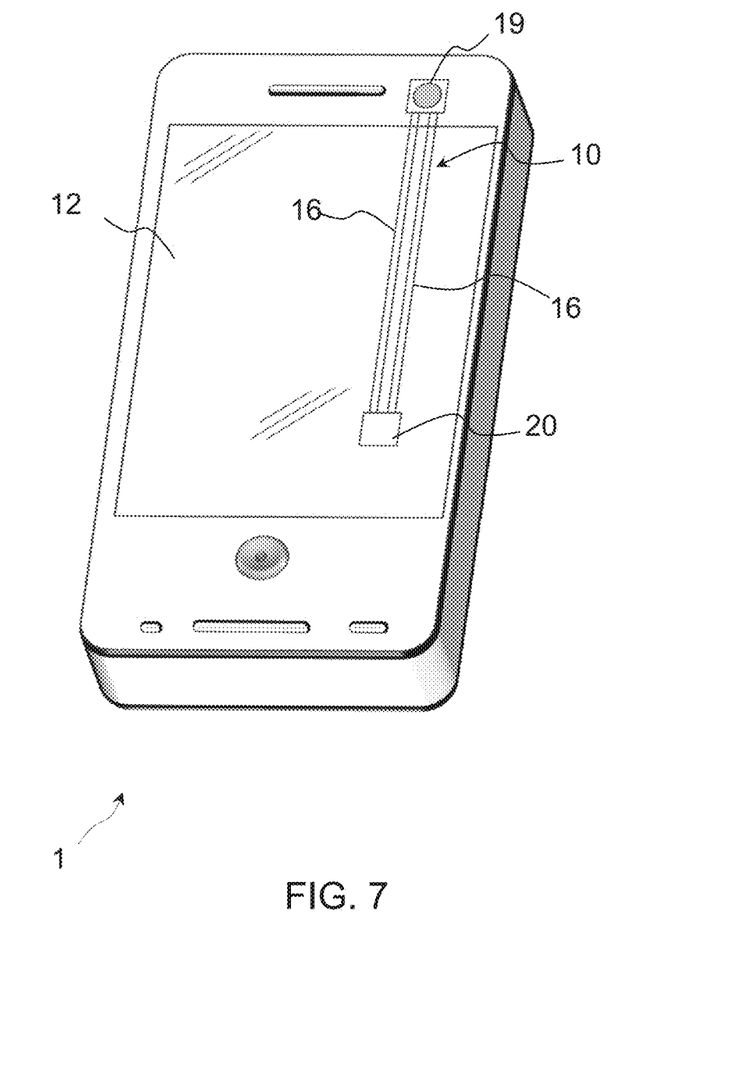
FIG. 7 is a 3D view of a handheld device, including a surface-guiding photonic device according to embodiments.

The tempered glass 12, 14 is arranged in the device 10, 10a, 10b so as for said superficial layer 12 to be at least partly exposed to air, as exemplified in FIG. 7. In addition, the glass substrate is assumed to be such that the an average refractive index of the superficial layer 12 is larger than each of: (i) the average refractive index of the bulk layer 14; and (ii) the refractive index of air. As a result, the tempered glass substrate 12, 14 makes it possible to confine (in a direction perpendicular to the main plane of the glass substrate) radiation that propagates in the superficial layer (in-plane, i.e., along a propagation direction y parallel to the main plane (x, y) of the substrate), in operation.

Note that the present devices 10, 10a, 10b are configured as surface-guiding photonic devices, i.e., they should allow light to be coupled into the superficial layer 12, and out-coupled therefrom, and may therefore include suitable optical coupling features, e.g., engraved on the glass substrate. In variants, optical coupling features may be external, but arranged so as to allow suitable optical couplings. In practice, such devices shall advantageously be configured to propagate light in a single mode regime (e.g., TE00/TM00 transversal modes).

As per the present structural arrangement, where the superficial layer 12 is exposed, at least partly, to air, so that present devices make it possible to essentially confine the mode propagation close to the surface, i.e., within the superficial thickness 12 of the glass substrate.

Thus, the present approach allows light to be confined out-of-plane (i.e., vertically in FIGS. 2-6), thanks to a gradient refractive index exhibited by the glass substrate, contrary to a conventional glass, whose uniform refractive index does not allow total internal reflection. For example, commercially available glass substrates may be used, such as the so-called Gorilla® glasses from Corning®.

Figure 4:
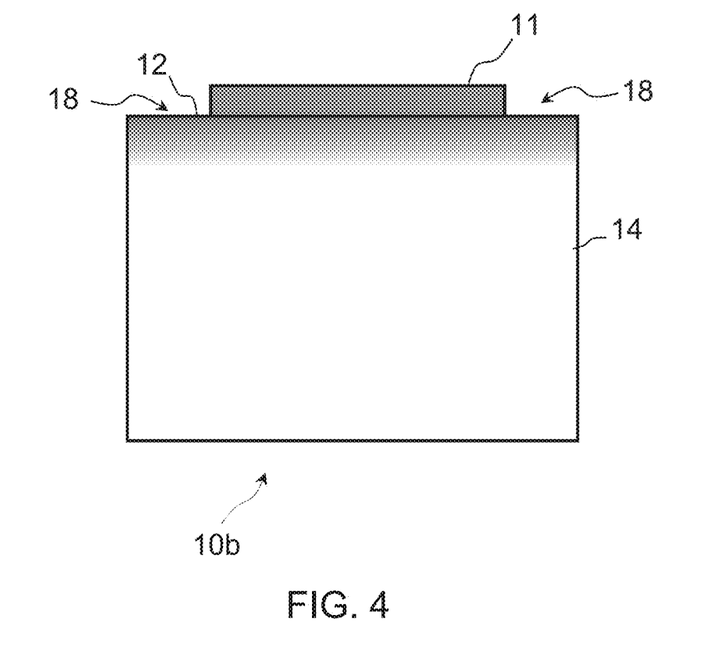
FIG. 4 is a 2D cross-sectional view of a surface-guiding photonic device, with a slab added on top, so as to form lateral structures, according to a third class of embodiments.
Figure 5:
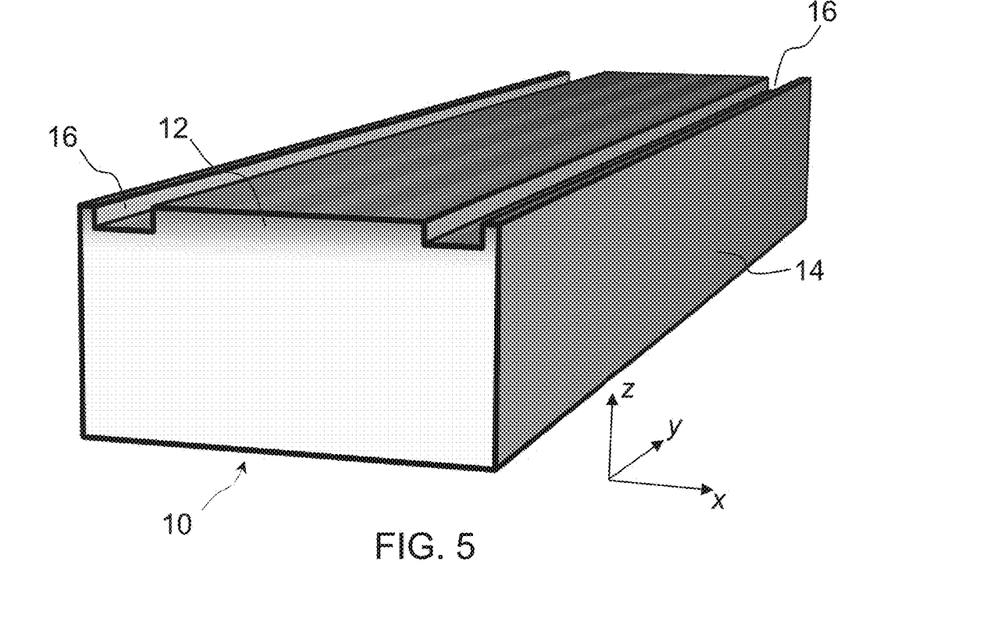
FIG. 5 is a 3D view of the device of FIG. 2.

Interestingly, as the present approach relies on intrinsic gradient refractive indices, it does not require any modification of the basis material (glass substrate) properties. E.g., no laser pulses are needed to modify the material and create the waveguide (at least not for the purpose of obtaining vertical confinement). The present approach does not more require creating sub-wavelength grooves to obtain the graded index. Only lateral structures need be processed, if needed, as described later in reference to specific embodiments. Finally, the present devices do typically not comprise any cladding layer coating the planar, tempered glass 12, 14 as these are not required, although a slab 11 may be added on top of the superficial layer 12, for reasons that will become apparent later (FIG. 4). As a result, the present approach allows shallow guides to be obtained, which can, in turn, easily be integrated in products. For completeness, and as an additional benefit, the present devices ease optical surface sensing.

On the contrary, prior art approaches typically rely on laser-processed devices, where femtosecond laser pulses are used to process the bulk below the surface of the glass substrate, hence forming material deformations. Other approaches use lithography and implantation techniques to form waveguides. However, such methods have drawbacks. In particular, laser pulses slow down the fabrication process and further impose constraints in terms of minimal depth required for the devices material deformations (which cannot be written close to the surface). Prior art methods may further require additional gradient index formation or complex structures (e.g., involving a 3-layer system), as opposed to just one material layer in the present case. Also prior art devices do usually not permit easy surface sensing, contrary to present devices.

Figure 1:
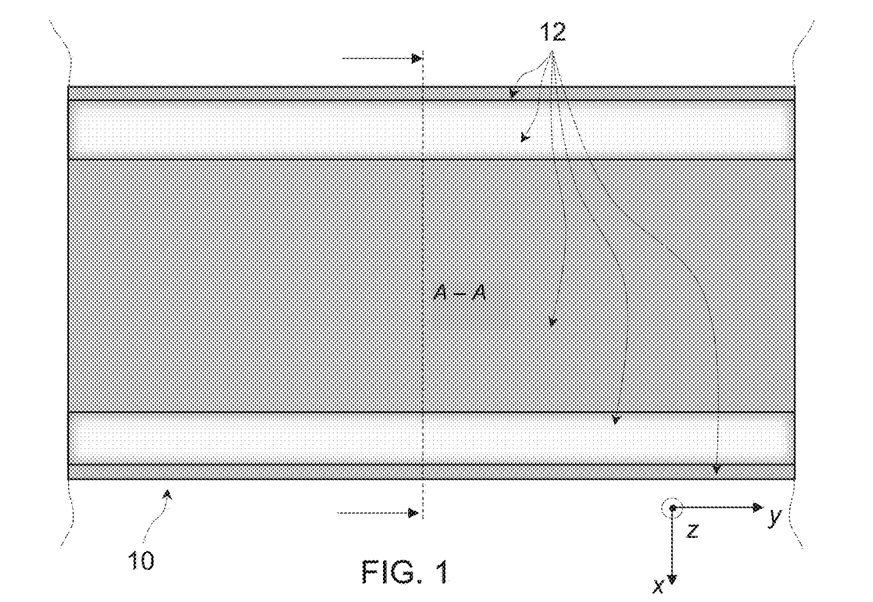
FIG. 1 is a top view of a surface-guiding photonic device involving a glass substrate, wherein an upper, superficial layer exhibits a gradient refractive index. Lateral trenches are performed in the superficial layer, as in a first class of embodiments.
Figure 3:
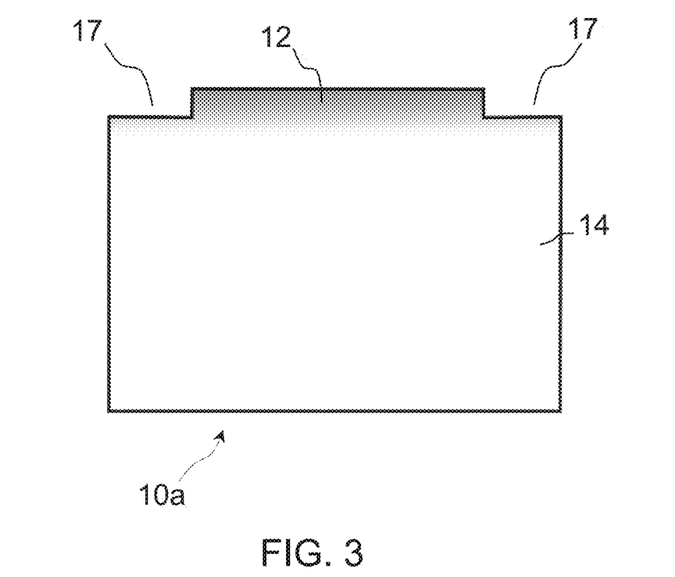
FIG. 3 is a 2D cross-sectional view of a surface-guiding photonic device, with laterally recessed edge portions, according to a second class of embodiments.

In embodiments as described below, the waveguide may for instance be completed by processing two parallel trenches or by otherwise forming recessed, lateral edge portions, in order to achieve a rib-like waveguide configuration (obtained, as a whole, from the same glass substrate as the lower bulk layer), as illustrated in FIGS. 1-3. In variants, FIG. 4, a slab (e.g., a polymer) may be sited on the top surface of the glass substrate (the superficial layer 12).

Specific embodiments are now described in detail, in reference to FIGS. 1-5. Devices 10, 10a, 10b depicted therein are provided with a planar, tempered glass 12, 14 that comprises lateral structures 16-18. Such lateral structures extend parallel to the propagation direction y. They confer the device a rib waveguide-like configuration. Namely, the lateral structures 16-18 form lateral recesses in the superficial layer 12, which recesses are otherwise configured to laterally confine light that propagates in the superficial layer 12, along direction y and, this, by total internal reflection. Suitable lateral structures may for instance be created using a laser to ablate the glass.

The lateral, recessed portions that result should be deep enough to substantially penetrate the superficial layer 12. It is, however, not necessary for the depth of the lateral structures 16-18 to exceed the thickness of the gradient index layer 12. In all cases, light is guided through the resulting waveguide, i.e., the superficial portion of the region 12 defined between the two lateral, recessed structures 16-18.

Concerning the propagated radiation: any optical wavelength (i.e., in the range from 100 nm to 1 mm, according to DIN 5031) may in principle be contemplated. However, a more likely lower bound will be 400 nm, because of potential ultraviolet (UV) absorption, which typically occurs under 400 nm with materials as used herein. Now, visible and infrared radiations are typically used in practice. The useful infrared wavelengths typically extend from about 700 nm to 2000 or 2500 nm (though this limit might be extended to 10 μm). Thus, a preferred range of wavelengths is, in practice, [400 nm; 2000 nm].

In embodiments, the average depth of each of the recesses 16-18 (as measured in direction z perpendicular to the main plane of the substrate) is less than the minimal gap between said recesses. This gap is measured parallel to the main plane of the substrate, as the distance between upper edges separating the lateral structures 16-17 from the middle portion of the superficial layer 12. This gap may for instance be of 10 μm, ±1 μm. This way, a structural configuration is achieved, which favors the confinement of the propagation mode in the superficial layer 12, i.e., close to the interface between the superficial layer 12 and air. In turn, shallow glass substrates can be used, which require minimal ablation to obtain the recessed, lateral structures 16-18.

In practice, the average depth of the recesses 16-18 is typically between 2 µm and 20 µm (subject to ±1 µm). The exact depths otherwise depend on the gradient index profile and said gap (e.g., 10 µm), i.e., representing the width of the waveguide, as the one skilled in the art will appreciate. Of course, the dimensions of the lateral structures 16-18 and the gap may need be adapted, depending on the application sought, the target wavelength(s) of the propagating mode(s), the exact material compositions, etc.

Figure 6:
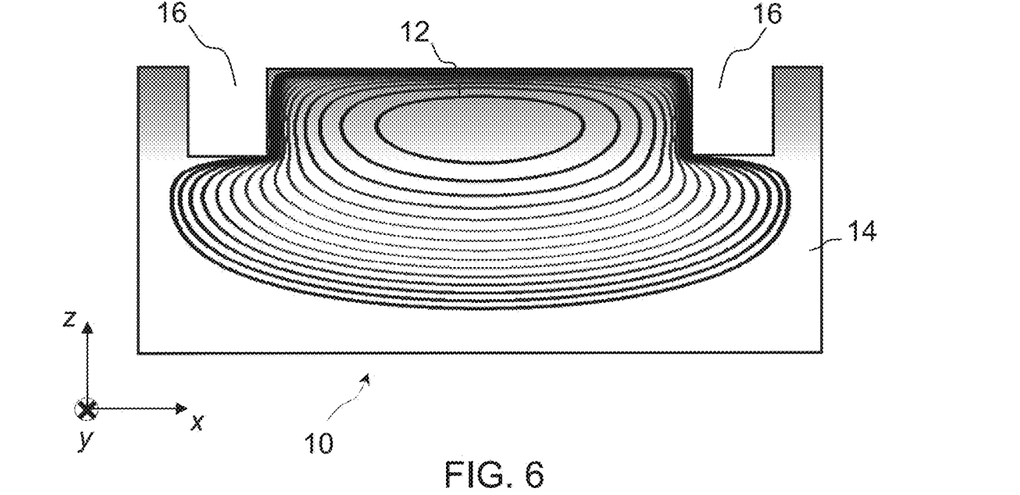
FIG. 6 is a 2D cross-sectional view of a device similar to that of FIGS. 1 and 2, onto which are superimposed contour lines depicting the square modulus of the $H_x$ component of the magnetic field of a TM mode.

As evoked earlier, preferred embodiments of the present devices 10 involve lateral structures formed as lateral trenches 16 performed in the superficial layer 12, as illustrated in FIGS. 2, 6, and 7. In typical embodiments, the depth of the lateral recesses is between 2 µm and 20 µm (±1 µm), whereas the average width of the trenches typically range from about 0.5 µm (±0.1 µm) to about 20 µm (±1 µm).

Although dimensions of the trenches may be devised so as to ease the fabrication process, one preferably designs the trenches so as for them to be sufficiently wide (e.g., two times the wavelength of the propagating mode). This way, the evanescent field will not extend into, i.e., penetrate outer (lateral) portions of the glass substrate, on the outer sides of the trenches. Yet, strictly speaking, the average width of each of the trenches (as measured parallel to the main plane of the substrate) need at least be equal to or larger than the average wavelength of the propagating mode.

In practice, the average width of the trenches is typically between 0.5 and 20 µm, as noted above. For example, to achieve full confinement within trenches 16, the minimal gap between the trenches may be of 10 µm (±1 µm), assuming a gradient index of $0.2 \cdot 10^{-6}$ per nanometer, and a minimal depth of ~5 µm for the lateral recesses 16. Such a configuration allows to achieve a single mode regime for propagating a mode having a wavelength of 532 nm.

In variants to trenches the lateral structures 17 may be formed as laterally recessed edge portions 17 of the superficial layer 12 (see FIG. 3). I.e., there is no residual outer portions extending (laterally) beyond the recesses 17 in that cases. The structure 17 depicted in FIG. 3 is, however, slightly more complicated to process, as they extend up to lateral edges and more material has to be etched, which, in turn, increases the risk of damage to the surface of the glass, compared to the structure of FIG. 2.

In the embodiments of FIGS. 2-3, only the basis, tempered glass material is needed to achieve a vertical confinement. In such embodiments, the upper surface of the waveguide region defined in the superficial layer 12 is entirely exposed to air. Now, more sophisticated variants can be contemplated, which involve a slab 11 on top of this the upper surface, such that the latter is only partly exposed, as illustrated in FIG. 4. In such embodiments, the slab 11 is arranged on the superficial layer 12 and extends along the propagation direction y. The slab 11 comprises a material whose refractive index is essentially constant along direction z. Yet, and as suggested by the gray levels used in FIG. 4, the refractive index of the slab 11 need be at least equal to (though it can be larger than) the value of the gradient refractive index of the layer 12, at the level of the interface between layer 12 and the slab 11.

As seen in FIG. 4, the slab 11 forms, together with residual, lateral portions of the superficial layer 12, lateral structures 18 that again form lateral recesses, as in the previous cases.

The value of the refractive index at the level of the interface may for example be equal to approximately 1.51, assuming a linear gradient, as in FIG. 2 (full-line curve). Typical refractive index values of the various layers are discussed later in detail. In the device 10b depicted in FIG. 4, the dielectric slab 11 on top of the gradient refractive index layer 12 may for instance have a thickness (as measured along z) that ranges from approximately 100 nm to 1 µm. As the one skilled in the art will appreciate, the optimal thickness of slab 11 will depend on its refractive index (a lower index requires a thicker slab) and the gradient refractive index layer 12 (steeper gradients leading to stronger confinement at the surface). There is a trade-off between, on the one hand, the need for thicker slabs that make the gradient index more effective, and, on the other hand, the need for sufficiently thin slabs, which is preferable, in practice, in terms of practical applications, integration potential (shallow devices provides more compactness and therefore ease integration) as well as fabrication processing.

In addition, although it would, in principle, be possible to create a rib waveguide-like configuration with a very thick slab with a high refractive index (e.g., 1.6), this would result in a suboptimal device, in which the gradient index of the superficial layer 12 has little benefits. Thus, the slab is preferably kept sufficiently thin, in order to prevent a rib waveguide regime.

In that respect, and as one may realize, although the devices shown in FIGS. 1-6 have a rib waveguide-like configuration, such devices are not rib waveguides per se, owing to the gradient index of the tempered layer 12. I.e., the rib-like configuration of FIG. 4 involves a layer 12 (underneath the slab 11), which has a gradient refractive index, rather than a constant index (in which case light would leak into the bulk layer 14, assuming a sufficiently thin slab).

Of all the examples of configurations shown in FIGS. 2-4, FIG. 1 is perhaps the easiest to process, as it does not require depositing additional material (as in FIG. 4) or large area to be etched or removed (as in FIG. 3).

At present, more shall be said about the various refractive indices. Referring back to FIG. 2, the present devices 10, 10a, 10b may for instance involve a superficial layer 12, whose profile of refractive index increases, from a value essentially corresponding to the average refractive index of the bulk layer 14, up to a maximal value (at the level of the upper interface). The slope of this increase will for instance be between $0.2 \cdot 10^{-6}$ and $0.5 \cdot 10^{-6}$ per nanometer. As mentioned earlier, the gradient refractive index may gradually increase up to the top surface of layer 12 (as reflected by the full-line curve in FIG. 2). Yet, a non-linear increase is possible too. Also, more sophisticated profiles may be observed (see the dotted-line curve in FIG. 2), where the profile first increases from a value essentially corresponding to the average refractive index of the bulk layer 14, up to a maximal value, and then decreases again up to the upper interface. In all cases, the refractive index will, on average, be higher than in the bulk layer 14, as per the fabrication process of the glass substrate.

For example, in order to achieve a single-mode regime (with a wavelength of approximately 532 nm), the gradient refractive index increase may for instance be of about $0.2 \cdot 10^{-6}$ per nanometer, e.g., so as to pass from 1.50 to 1.51 with a 50 µm thick layer 12, e.g., assuming a waveguide having trenches that are 10 µm wide and 5 µm deep, separated by a gap of 10 µm.

In other examples, assuming a gap of 10 µm, the same single-mode regime can still be achieved (at 532 nm) using:

A gradient of 0.3 $10^{-6}$ per nanometer, together with waveguides having approximately 10 μm wide trenches that are 4.5 μm deep;

A gradient of 0.4 $10^{-6}$ per nanometer, with trenches that are approximately 10 μm wide and 4.0 μm deep; and A gradient of 0.5 $10^{-6}$ per nanometer, with trenches that are approximately 10 μm wide and 3.5 μm deep.

In embodiments, the glass substrate is designed so as for the effective gradient refractive index value of the superficial layer 12 (for a given propagation mode) to differ from the average refractive index of the bulk layer 14 by at least 0.005 (assuming visible or infrared radiation). Note that an "effective" gradient refractive index refers to an index value as effective for a particular mode, whereas an "average" refractive index value refers to spatially averaged refractive index values (e.g., integrated over the relevant thickness, measured along z, of the layer in question, and then suitably normalized).

Preferably though, the difference between said effective gradient refractive index value and the average refractive index of the bulk layer 14 is between 0.01 and 0.02. Note that such values (and their differences) are typically difficult to precisely measure, experimentally, even for the bulk layer 14, owing to the typical thicknesses of the glass substrate used (e.g., only 50 μm thick). They can, however, be estimated, e.g., taking into account the ion penetration length. Refractive index values can for instance precisely be estimated thanks to known theoretical methods. Else, experimental methods are known, which allow to estimate atomic distributions in the material (e.g., STEM microscopy). From this, refractive indices may be inferred. In addition, effective indices may be obtained using techniques that focus on modes propagating through the waveguides (e.g., SNOM microscopy), which, in turn, allow index values to be inferred.

In particular, an effective (mode specific) gradient index can be simulated for the whole superficial layer 12. Simulations performed by the Inventor have shown that effective refractive indices of the superficial layer 12 will typically be 0.01-0.02 higher than the bulk average refractive index, assuming refractive indices as described below.

For instance, the maximal value of the gradient refractive index of the superficial layer 12 shall typically be equal to 1.51 (using state-of-the-art chemical toughening processes), while the average refractive index of the bulk layer 14 typically varies between 1.49 and 1.50 (as measured at 590 nm).

In practice, there is no or little propagation losses in the superficial layer (k≈0). Only ultraviolet light (<400 nm) may get absorbed. The sole measurable losses are due to scattering caused by the defects in the materials.

Additional material characteristics are now discussed. To start with, the average thickness of the tempered, superficial layer 12 is typically larger than or equal to 10 μm. This value may vary by a few microns, depending on the tempering process used. In comparison, the average thickness of the bulk layer 14 will typically be between 0.50 mm (although it could be thinner) and 2.00 mm. Thus, the average thickness of the planar, tempered glass 12, 14 is typically between 0.51 and 2.01 mm.

Regarding material compositions, the planar, tempered glass 12, 14 shall preferably comprise an aluminosilicate glass. Preferably though, it comprises an alkali aluminosilicate glass, as known per se.

Referring now to FIG. 7: according to another aspect, the invention can further be embodied as a consumer good 1. The latter comprises a surface-guiding photonic device 10, 10a, 10b, as described above. The device 1 may further comprises optical coupling means, to couple light into and from such devices, although such optical coupling mechanisms may already be provided within the devices 10-10b, as mentioned earlier.

For instance, and as assumed in FIG. 7, the consumer good 1 may be a handheld user device 1, e.g., a smartphone, having a display, wherein a surface-guiding photonic device 10 is arranged as a protective cover glass for the display.

In particular, the handheld device may comprise optical coupling features 20 to couple light (or backlight) from the display into the surface-guiding photonic device 10. Example of such coupling features include microstructures, e.g., patterned directly on the glass substrate, as known per se. Possible coupling devices further include: butt-coupling into the waveguide with white LED or laser; and/or a second-order grating, e.g., for coupling the backlight into the device 10. For example, and as assumed in FIG. 7, an out-coupling configuration may be devised using second-order grating for directing the light from the waveguide directly to a camera 19 provided with the handheld device, additionally a second-order grating 20 might be used as a wavelength filter.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A surface-guiding photonic device, comprising:
   a planar, tempered glass, the latter in turn comprising:
      a bulk layer; and
      a tempered superficial layer contiguous with the bulk layer;
   wherein the tempered glass is arranged in the device so as for said superficial layer to be at least partly exposed to air, and has an intrinsic gradient refractive index in a direction z perpendicular to a main plane of the planar, tempered glass, whereas the bulk layer has an essentially constant refractive index along said direction z, whereby the superficial layer has an average refractive index that is larger than each of an average refractive index of the bulk layer and a refractive index of air, so as to confine, perpendicularly to said main plane, radiation propagating in the tempered superficial layer along a propagation direction y that is parallel to said main plane, in operation; and
   wherein said surface-guiding photonic device does not include any cladding layer coating said planar, tempered glass.

2. The surface-guiding photonic device according to claim 1, wherein:
a profile of the gradient refractive index of the superficial layer increases from the average refractive index of the bulk layer with an average slope that is between $0.2 \times 10^{-6}$ and $0.5 \times 10^{-6}$ per nanometer.

3. The surface-guiding photonic device according to claim 1, wherein:
an effective gradient refractive index value of the superficial layer for a propagation mode of said radiation differs from the average refractive index of the bulk layer by at least 0.005.

4. The surface-guiding photonic device according to claim 3, wherein:
a difference between said effective gradient refractive index value and the average refractive index of the bulk layer is between 0.01 and 0.02.

5. The surface-guiding photonic device according to claim 3, wherein:
a maximal value of the gradient refractive index of the superficial layer is equal to 1.51 and the average refractive index of the bulk layer is between 1.49 and 1.50, for optical radiation having an average wavelength of 590 nm.

6. The surface-guiding photonic device according to claim 1, wherein:
an average thickness of the tempered, superficial layer is larger than or equal to 10 µm.

7. The surface-guiding photonic device according to claim 6, wherein:
an average thickness of the bulk layer is between 0.50 and 2.00 mm.

8. The surface-guiding photonic device according to claim 1, wherein:
the planar, tempered glass comprises an aluminosilicate glass.

9. A surface-guiding photonic device, comprising:
a planar, tempered glass, the latter in turn comprising:
   a bulk layer; and
   a tempered superficial layer contiguous with the bulk layer;
   wherein the tempered glass is arranged in the device so as for said superficial layer to be at least partly exposed to air, and has an intrinsic gradient refractive index in a direction z perpendicular to a main plane of the planar, tempered glass, whereas the bulk layer has an essentially constant refractive index along said direction z, whereby the superficial layer has an average refractive index that is larger than each of an average refractive index of the bulk layer and a refractive index of air, so as to confine, perpendicularly to said main plane, radiation propagating in the tempered superficial layer along a propagation direction y that is parallel to said main plane, in operation;
   wherein:
   the planar, tempered glass further comprises lateral structures extending parallel to the propagation direction y, so as for the device to have a rib waveguide-like configuration, wherein said lateral structures form recesses in the superficial layer that are configured to laterally confine radiation propagating in the tempered superficial layer along said propagation direction y, by total internal reflection.

10. The surface-guiding photonic device according to claim 9, wherein:
an average depth of each of said recesses, as measured in a direction perpendicular to said main plane, is less than a minimal gap between the recesses, as measured in a direction parallel to said main plane.

11. The surface-guiding photonic device according to claim 10, wherein:
said average depth is between 2 µm and 20 µm, ±1 µm.

12. The surface-guiding photonic device according to claim 10, wherein:
said minimal gap is of 10 µm, ±1 µm.

13. The surface-guiding photonic device according to claim 9, wherein:
said lateral structures are formed by lateral trenches in the superficial layer.

14. The surface-guiding photonic device according to claim 13, wherein:
an average width of each of said trenches, as measured in a direction parallel to said main plane, is equal to or larger than an average wavelength of a propagating mode of said radiation.

15. The surface-guiding photonic device according to claim 13, wherein:
said average width is between 0.5 µm, ±0.1 µm, and 20 µm, ±1 µm.

16. The surface-guiding photonic device according to claim 9, wherein:
said lateral structures are formed by laterally recessed edge portions of the superficial layer.

17. The surface-guiding photonic device according to claim 9, wherein:
the device further comprises a slab arranged on the superficial layer and extending along said propagation direction y, wherein the slab comprises a material whose refractive index is essentially constant along said direction z and is equal to or larger than a value of the gradient refractive index at an interface between the superficial layer and the slab, the slab forming, together with said superficial layer, the lateral structures.

18. A consumer good, comprising a surface-guiding photonic device, said surface-guiding photonic device in turn comprising:
a planar, tempered glass, the latter in turn comprising:
   a bulk layer; and
   a tempered superficial layer contiguous with the bulk layer;
wherein the tempered glass is arranged in the device so as for said superficial layer to be at least partly exposed to air, and has an intrinsic gradient refractive index in a direction z perpendicular to a main plane of the planar, tempered glass, whereas the bulk layer has an essentially constant refractive index along said direction z, whereby the superficial layer has an average refractive index that is larger than each of an average refractive index of the bulk layer and a refractive index of air, so as to confine, perpendicularly to said main plane, radiation propagating in the tempered superficial layer along a propagation direction y that is parallel to said main plane, in operation; and
wherein the consumer good is a handheld user device with a display, wherein the surface-guiding photonic device is arranged as a protective cover glass of the display.

19. The consumer good according to claim 18, wherein the planar, tempered glass further comprises lateral structures extending parallel to the propagation direction y, so as for the device to have a rib waveguide-like configuration, wherein said lateral structures form recesses in the superficial layer that are configured to laterally confine radiation propagating in the tempered superficial layer along said propagation direction y, by total internal reflection.

20. The consumer good according to claim 19, wherein:
the handheld device further comprises optical coupling structures to couple light emitted from the display into the surface-guiding photonic device.

* * * * *